United States Patent
Du et al.

(10) Patent No.: US 9,224,030 B2
(45) Date of Patent: Dec. 29, 2015

(54) SENSOR IDENTIFICATION

(71) Applicant: QUALCOMM Incorporated, San Diego, CA (US)

(72) Inventors: Eliza Yingzi Du, Cupertino, CA (US); John Keith Schneider, Amherst, NY (US); Suryaprakash Ganti, Los Altos, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/462,338

(22) Filed: Aug. 18, 2014

(65) Prior Publication Data
US 2015/0199552 A1 Jul. 16, 2015

Related U.S. Application Data

(60) Provisional application No. 61/926,037, filed on Jan. 10, 2014.

(51) Int. Cl.
| G06K 9/68 | (2006.01) |
| G06K 9/00 | (2006.01) |
| G06F 21/32 | (2013.01) |
| G06K 9/62 | (2006.01) |

(52) U.S. Cl.
CPC ............. *G06K 9/0002* (2013.01); *G06F 21/32* (2013.01); *G06K 9/00006* (2013.01); *G06K 9/00013* (2013.01); *G06K 9/00577* (2013.01); *G06K 9/6215* (2013.01); *G06K 2009/00583* (2013.01); *G06K 2209/00* (2013.01); *G06T 2207/30168* (2013.01); *G06T 2207/30196* (2013.01)

(58) Field of Classification Search
CPC .. G06F 21/32; G06K 9/00006; G06K 9/0002; G06K 9/6215; G06K 9/00013; G06K 9/00577; G06K 2009/00583; G06K 2209/00; G06T 2207/30168; G06T 2207/30196
See application file for complete search history.

(56) References Cited

U.S. PATENT DOCUMENTS

| 7,271,833 B2 | 9/2007 | Kubota et al. |
| 7,427,759 B1 | 9/2008 | Pruvot et al. |
| 7,787,034 B2 | 8/2010 | Ying et al. |
| 8,610,805 B2 | 12/2013 | Raynor et al. |

(Continued)

OTHER PUBLICATIONS

Chen, M., et al., "Determining Image Origin and Integrity Using Sensor Noise", IEEE Transactions on Information Forensics and Security, vol. 2, No. 1, Mar. 1, 2008, pp. 74-90.

(Continued)

*Primary Examiner* — Brian Le
(74) *Attorney, Agent, or Firm* — Kilpatrick Townsend & Stockton LLP

(57) ABSTRACT

Techniques described here use variations in the sensor to generate an identifier for the sensor. Each sensor may be comprised of sub-sensing units, called pixels that may demonstrate variation in their sensing capability from one pixel to another. Embodiments of the invention, describe a method for using the relative variance of each pixel (relative to the whole sensor or/and a portion of the sensor) in generating an identifier for the sensor. In one embodiment, the method may obtain information associated with a plurality of pixels from a sensor, detect variations in the information associated for each of the pixels from a subset of the plurality of pixels and generate an identifier for the sensor using the detected variations in the information associated with each of the pixels from the subset of plurality of pixels.

30 Claims, 14 Drawing Sheets

(56) References Cited

U.S. PATENT DOCUMENTS

| | | |
|---|---|---|
| 2007/0030531 A1 | 2/2007 | Cao |
| 2011/0033127 A1* | 2/2011 | Rasmusson ............... G06T 9/00 382/238 |
| 2011/0075026 A1* | 3/2011 | Wallace ............... H04N 7/0142 348/448 |
| 2012/0195476 A1 | 8/2012 | Bayram et al. |
| 2013/0223711 A1* | 8/2013 | Knapp .................... G06K 9/62 382/131 |

OTHER PUBLICATIONS

Filler, T., et al., "Using Sensor Pattern Noise for Camera Model Identification", 15th IEEE International Conference on Image Processing, Oct. 12-15, 2008, pp. 1296-1299.

International Search Report and Written Opinion—PCT/US2015/010111—ISA/EPO—Apr. 7, 2015.

* cited by examiner

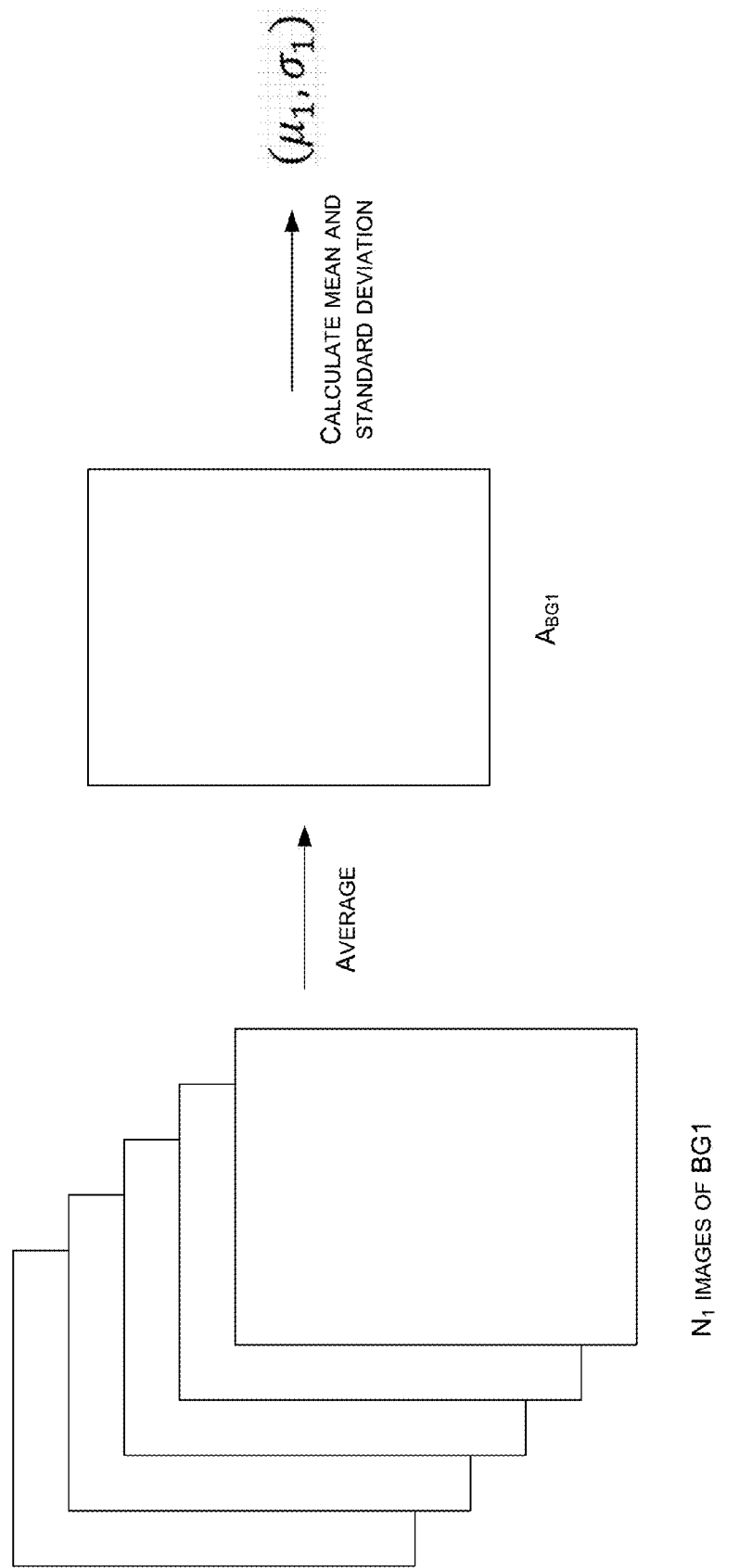

SENSOR IDENTIFICATION

CROSS-REFERENCES TO RELATED APPLICATIONS

This application is a non-provisional application and claims the benefit of priority of U.S. Provisional Application No. 61/926,037 titled "SENSOR IDENTIFICATION," and filed on Jan. 10, 2014, which is herein incorporated by reference in its entirety for all purposes.

TECHNICAL FIELD

The present disclosures generally relate to generating identifiers, and more specifically, generating unique identifiers for sensors.

BACKGROUND

Sensors detect physical input and in some instances convert the physical input to electrical or optical output. The electrical output may be used by a device hosting the sensor in a variety of ways. Applications of sensors are widespread and sensors are used in everyday devices, such as mobile devices. Some examples of sensors may include inertial sensors, imaging sensors, chemical sensors, biometric sensors, ultrasonic sensors, etc. Ultrasonic sensors may operate by interpreting the echoes from radio or sound waves. For instance, ultrasonic sensors may generate high frequency sound waves and evaluate the echo which is received back by the sensor. In some implementations, ultrasonic sensors calculate the time interval between sending the signal and receiving the echo to determine the distance to an incident surface. In some instances, the ultrasonic sensors may also operate in a passive mode by detecting ambient signals from the environment. One application of ultrasonic sensors may include detecting fingerprints of a user for authenticating the user.

In some instances, uniquely identifying the sensor may increase or augment the security of the authentication process. In some instances, uniquely identifying the sensor may allow systems, remote servers, clouds, applications and programs in improving security and also enable forensics in instances of security breaches.

BRIEF SUMMARY

Techniques described herein provide a method for generating an identifier, and more specifically, generating unique identifiers for sensors.

In some aspects, the identifier for the sensor uniquely (or uniquely within an acceptable degree) identifies the sensor. In some instances, uniquely identifying the sensor may aid in increasing or augmenting the security of the authentication process. In some instances, uniquely identifying the sensor may allow systems, remote servers, clouds, applications and programs in improving security and also enable forensics in instances of security breaches.

In some instances, uniquely identifying the sensor may increase or augment the security of the authentication process. Some current solutions provide fixed identifiers, in some instances, etched into the sensor. However, these identifiers are inflexible; are expensive to implement; can be faked, masked, changed or stolen; and do not provide a cost effective and robust method for uniquely identifying a sensor.

In certain aspects, techniques describe a method for generating an identifier for the sensor using intrinsic properties of the sensor. Described techniques allow generation of an identifier in a cost effective manner using spatially temporal and global information from the sensor that is robust against contrast variations, input signal variations, and gradual changes of sensor characteristics. Furthermore, techniques described allow for using an identifier for a sensor even in instances where the sensors may have spatial and temporal defects and degradations.

In an example method for generating an identifier for a sensor, the method may include accessing, by a computing device, sensed information for each pixel from a plurality of pixels of the sensor for an at least one sensing environment, determining, by the computing device, a first variance representing a variation in the sensed information for a first subset of the plurality of pixels using the sensed information for each pixel from the first subset of the plurality of pixels of the sensor, determining, by the computing device, a second variance representing a variation in the sensed information for a second subset of the plurality of pixels using the sensed information for each pixel from the second subset of the plurality of pixels of the sensor, wherein the first subset of the plurality of pixels is different from the second subset of the plurality of pixels, determining, by the computing device, a pixel identifier value for each pixel from a third subset of the plurality of pixels by comparing the sensed information for each pixel from the third subset of the plurality of pixels with the first variance and the second variance, and generating, by the computing device, the identifier using the pixel identifier values for each of the plurality of pixels from the third subset of the plurality of pixels.

In one aspect of the method, the plurality of pixels from the third subset may also belong to the first subset and the second subset. In certain aspects, the plurality of pixels from the second subset may also belong to the first subset.

In one aspect of the method, the method further comprises determining the pixel identifier value for each pixel from the third subset of the plurality of pixels by receiving the sensed information for a plurality of sensing environments. For example, the sensing environments may include bias current enabled, bias current disabled, bias current shifted, tone burst enabled, or tone burst disabled.

In one aspect of the method, generating the identifier value may include concatenating the pixel identifier values for the plurality of pixels from the third subset of the plurality of pixels. In some implementations, the plurality of pixels belonging to the second subset is received by the computing device coupled to the sensor from a remote device.

In certain aspects, the sensor may be an image sensor or an ultrasonic sensor. In some aspects, the sensor may be an ultrasonic fingerprint sensor. In some instances, the sensor may be used for authenticating a user using biometric information.

According to certain aspects, an example device for generating an identifier for a sensor may include the sensor coupled to the device, the sensor comprising a plurality of pixels configured to sense information, a memory, and a processor coupled to the memory. The processor may be configured to receive the sensed information for each pixel from the plurality of pixels of the sensor for an at least one sensing environment, determine a first variance representing a variation in the sensed information for a first subset of the plurality of pixels using the sensed information for each pixel from the first subset of the plurality of pixels of the sensor, determine a second variance representing a variation in the sensed information for a second subset of the plurality of pixels using the sensed information for each pixel from the second subset of the plurality of pixels of the sensor, wherein the first subset of the plurality of pixels is different from the second subset of the plurality of pixels, determine a pixel identifier value for each pixel from a third subset of the plurality of pixels by comparing the sensed information for each pixel from the third subset of the plurality of pixels with the first variance and the second variance, and generate the identifier using the pixel identifier values for each of the plurality of pixels from the third subset of the plurality of pixels.

In one aspect of the example device, the plurality of pixels from the third subset may also belong to the first subset and the second subset. In certain aspects, the plurality of pixels from the second subset may also belong to the first subset.

In one aspect of the example device, the method further comprises determining the pixel identifier value for each pixel from the third subset of the plurality of pixels by receiving the sensed information for a plurality of sensing environments. For example, the sensing environments may include bias current enabled, bias current disabled, bias current shifted, tone burst enabled, or tone burst disabled.

In one aspect of the example device, generating the identifier value may include concatenating the pixel identifier values for the plurality of pixels from the third subset of the plurality of pixels. In some implementations, the plurality of pixels belonging to the second subset is received by the device coupled to the sensor from a remote device.

In certain aspects, the sensor may be an image sensor or an ultrasonic sensor. In some aspects, the sensor may be an ultrasonic fingerprint sensor. In some instances, the sensor may be used for authenticating a user using biometric information.

In an example non-transitory computer-readable storage medium, wherein the non-transitory computer-readable storage medium comprises instructions executable by a processor, the instructions may include instructions to receive sensed information for each pixel from a plurality of pixels of a sensor for an at least one sensing environment, determine a first variance representing a variation in the sensed information for a first subset of the plurality of pixels using the sensed information for each pixel from the first subset of the plurality of pixels of the sensor, determine a second variance representing a variation in the sensed information for a second subset of the plurality of pixels using the sensed information for each pixel from the second subset of the plurality of pixels of the sensor, wherein the first subset of the plurality of pixels is different from the second subset of the plurality of pixels, determine a pixel identifier value for each pixel from a third subset of the plurality of pixels by comparing the sensed information for each pixel from the third subset of the plurality of pixels with the first variance and the second variance, and generate the identifier using the pixel identifier values for each of the plurality of pixels from the third subset of the plurality of pixels.

In one aspect of the non-transitory computer-readable storage medium, the plurality of pixels from the third subset may also belong to the first subset and the second subset. In one aspect of the non-transitory computer-readable storage medium, the plurality of pixels from the second subset may also belong to the first subset. In one instance, the instructions determine the pixel identifier value for each pixel from the third subset of the plurality of pixels by receiving the sensed information for a plurality of sensing environments. In certain aspects, the plurality of pixels belonging to the second subset may be received by the device coupled to the sensor from a remote device.

According to certain aspects, an example method for authenticating a computing device may include, receiving, at a first computing device, a first identifier for a sensor from a second computing device, wherein the sensor is coupled to the second computing device, determining, at the first computing device, a second identifier for the sensor using a first variance associated with a first subset of pixels from the plurality of pixels for the sensor, a second variance associated with a second subset of pixels from the plurality of pixels for the sensor and information associated with each of a third subset of pixels from the plurality of pixels, and determining, at the first computing device, if the first identifier and the second identifier both are associated with the sensor by comparing the first identifier and the second identifier.

In some aspects of the example method, comparing the first identifier and the second identifier, for determining if the first identifier and the second identifier are both associated with the sensor, may include determining a distance between the first identifier and the second identifier, and determining that the first identifier and the second identifier are both associated with the sensor if the distance is shorter than a threshold. In certain aspects, the plurality of pixels from the third subset also belong to the first subset and the second subset and the second subset also belongs to the first subset. In some instances, determining the pixel identifier value for each pixel from the third subset of the plurality of pixels comprises receiving the sensed information for a plurality of sensing environments. In one aspect, the sensor is an ultrasonic sensor.

Example techniques, described herein, use variations in the sensor to generate an identifier. Each sensor may be comprised of sub-sensing units, called pixels, that may demonstrate variation in their sensing capability from one pixel to another, due to, but not limited to, the manufacturing process, the variability of the materials used in the construction of the sensor, and the analog-to-digital conversion process. Examples of the teachings of the disclosure describe a method for using the relative variance associated with each pixel (relative to the whole sensor or/and a portion of the sensor) in generating an identifier for the sensor. In certain aspects, the method may obtain information associated with a plurality of pixels from a sensor, detect variations in the information associated with each of the pixels from a subset of the plurality of pixels and generate an identifier for the sensor using the detected variations in the information associated with each of the pixels from the subset of plurality of pixels.

The foregoing has outlined rather broadly features and technical advantages of examples in order that the detailed description that follows can be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

FIG. 7 illustrates an example process for generating a mean and standard deviation for multiple scans of the sensor.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Techniques described herein provide a method, system and apparatus for generating an identifier for a sensor. Sensors detect physical input and in some instances convert the physical input to electrical or optical output. The electrical output may be used by a device hosting the sensor in a variety of ways. Some examples of sensors may include inertial sensors, imaging sensors, chemical sensors, biometric sensors, ultrasonic sensors, etc. Ultrasonic sensors may operate by interpreting the echoes from radio or sound waves. For instance, ultrasonic sensors may generate high frequency sound waves and evaluate the echo which is received back by the sensor. In some implementations, ultrasonic sensors calculate the time interval between sending the signal and receiving the echo to determine the distance to an incident surface. In some instances, the ultrasonic sensors may also operate in a passive mode by detecting ambient signals from the environment. One application of ultrasonic sensors may include detecting fingerprints of a user for authenticating the user.

In some embodiments, the identifier for the sensor may refer to a string of bits that uniquely (or unique within an acceptable degree) identifies the sensor. In some instances, uniquely identifying the sensor may increase or augment the security of the authentication process. Uniquely identifying the sensor may allow systems, remote servers, clouds, applications and programs to improve security and also enable forensics in instances of security breaches, in some instances. For example, in some instances, it may be useful for a back-end system to ascertain that a user fingerprint was acquired using a specific sensor.

Some current solutions provide fixed identifiers, in some instances, etched into the sensor. However, these identifiers are inflexible, expensive to implement and can be faked, masked, changed or stolen. Techniques described herein provide a cost effective and robust method for identifying a sensor.

In certain embodiments of the invention, techniques describe a method for generating an identifier for the sensor using intrinsic properties of the sensor. Described techniques allow generation of an identifier in a cost effective manner using spatially temporal and global information from the sensor that is robust against contrast variations, input signal variations, and gradual changes of sensor characteristics. Furthermore, techniques described herein allow for using an identifier for a sensor even in instances where the sensors have defects and degradations.

Figure 1:
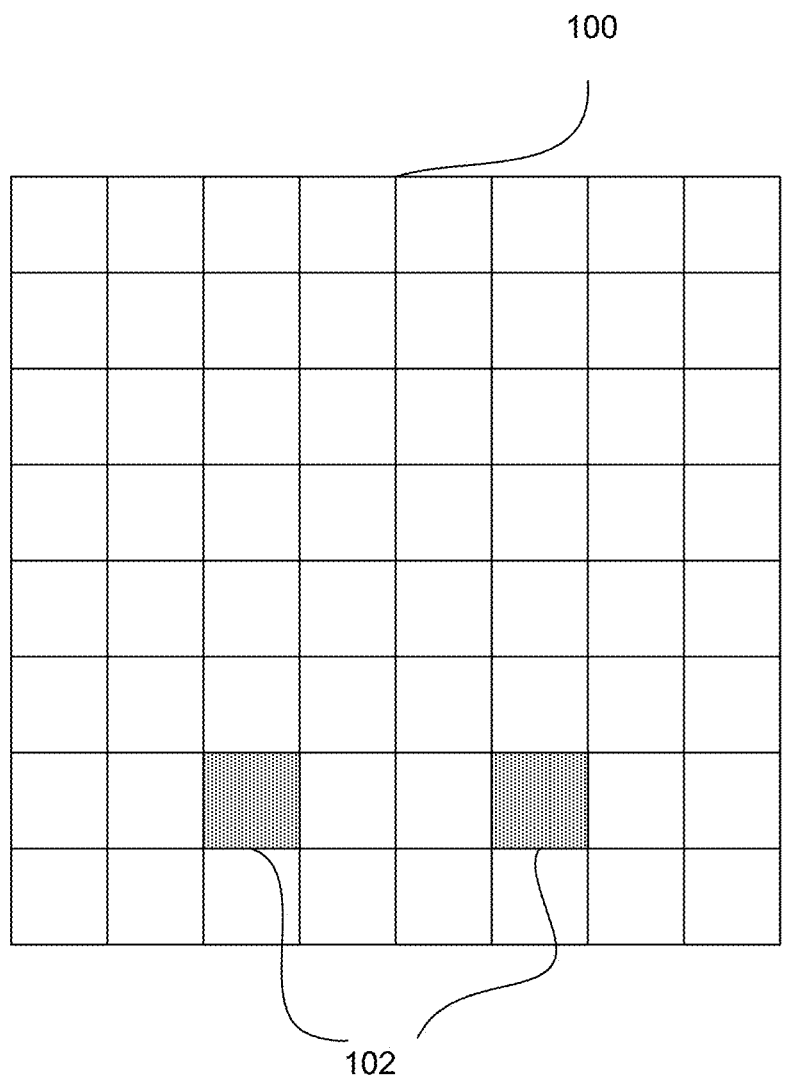
FIG. 1 illustrates an example sensor comprising a plurality of pixels.

In one embodiment, techniques described use variations in the sensor to generate an identifier. FIG. 1 illustrates an example sensor 100 comprising one or more pixels. In some instances, a "pixel" may also be referred to as a "pixel circuit" and used interchangeably without departing from the scope of the invention. Pixels may be sub-sensing units within the sensor. In FIG. 1, the illustration of the sensor 100 represents 64 (8×8) pixels in the sensor. In various implementations, the shape of the sensor and the pixels, the number of pixels and the spacing between the pixels may vastly vary, without departing from the scope of the invention. Pixel blocks 102 represent two example pixels from a grid of 64 pixels.

Figure 2:
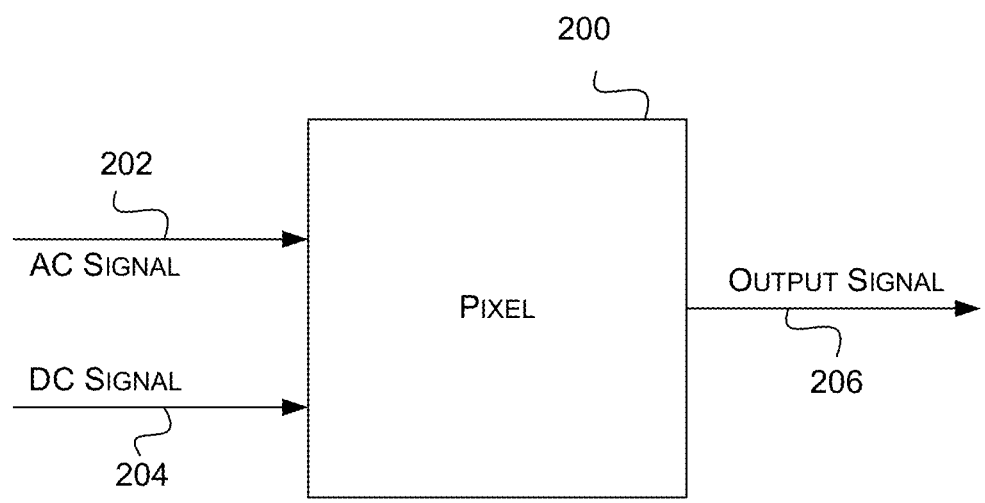
FIG. 2 illustrates an example of a pixel circuit.

FIG. 2 illustrates an example of a pixel 200 shown in FIG. 1. Each pixel of the sensor may be capable of sensing and may be constructed using one or more transistors, diodes and resistors. An example of a pixel is a thin-film transistor (TFT) pixel circuit. In some implementations, an ultrasonic sensor may use a plurality of TFT pixel circuits.

In one example implementation, the pixel may receive an alternative current (AC) signal 202 and a direct current (DC) signal 204. In some implementations, the pixel 200 may receive only the AC signal 202, only the DC signal 204, both AC signal 202 and DC signal 204 or no signal at all. In an ultrasonic sensor, the current may be used for exciting waves inside the sensor. The ultrasonic sensor may sense the echo which is received back by the sensor. In some implementations, ultrasonic sensors calculate the time interval between sending the signal and receiving the echo to determine the distance to an incident surface. In some instances, the ultrasonic sensors may also operate with little or no current and operate in a passive mode by detecting ambient signals from the environment.

The output signal 206 may indicate the result of the sensing performed by the sensor. For example, the output signal 206 may output a current and at a particular voltage. In some instances, the output signal 206 may be interpreted as an analog signal that may be further digitized using an analog-to-digital converter (ADC) circuit based on the current and/or the voltage level of the output signal 206. An example of an ADC is described in more detail in FIG. 4. In some aspects, the output signal 206 for the various pixels may vary for the same AC signal 202, DC signal 204, or stimulus (e.g., finger present or not present) due to inherent differences in the pixels.

Embodiments of the invention use the variation associated with the individual pixels from the sensor in generating an identifier for the sensor. In some embodiments, the detected variation is measured relative to the variation of a part of the sensor or/and the entire sensor in generating the identifier for the sensor. Using relative measurements allows for gradual changes of the sensor and even minor damage to the sensor (i.e., dead pixels) without losing the ability to uniquely identify the sensor.

Variations in sensing of the individual pixels may be introduced due to a variety of reasons. For example, variations may be introduced through the manufacturing process of the circuit that includes several different components, such as the transistors, diodes and resistors. In manufacturing, due to non-ideal manufacturing processes, each pixel circuit or a group of pixel circuits may be different from another pixel circuit or group of pixels of the sensor.

Figure 3:
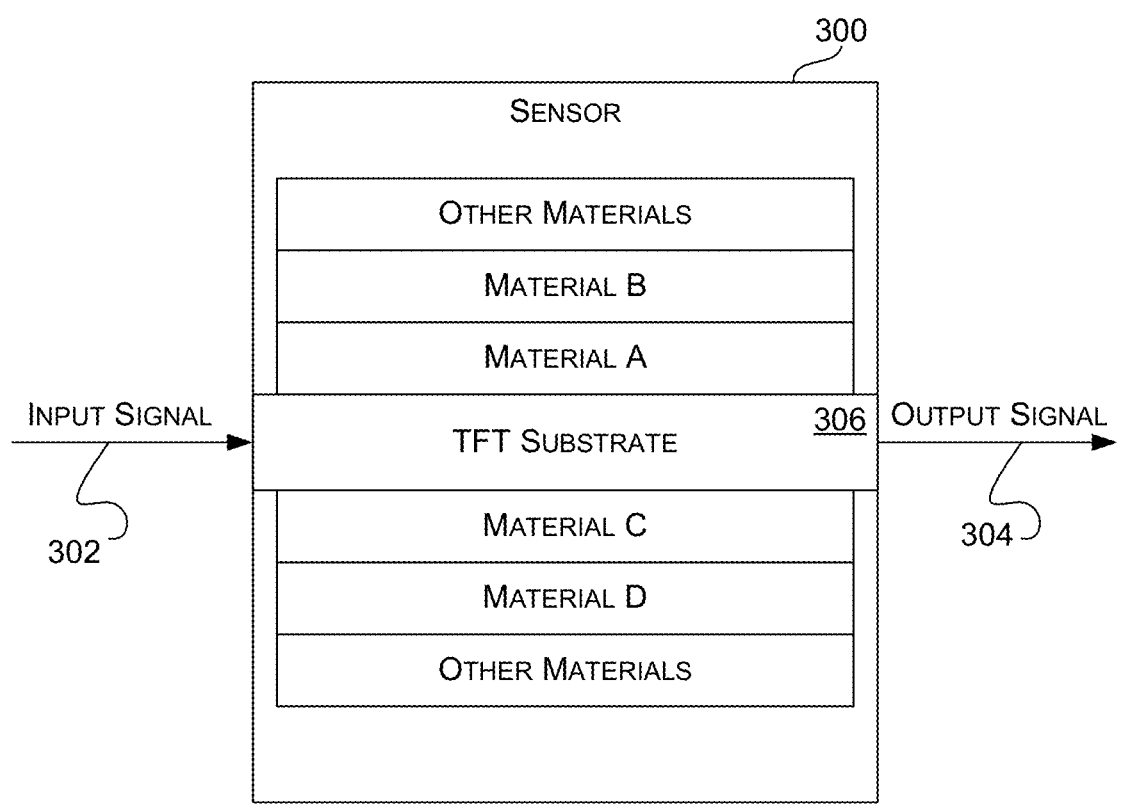
FIG. 3 illustrates an example representation of the material layout of an ultrasonic sensor.

Similarly, variations in the different materials over a contiguous or non-contiguous region of the materials used in the construction of the sensor may also affect the sensing capabilities of each pixel or group of pixels. For example, FIG. 3 illustrates an example representation of the layout of an ultrasonic sensor 300. The ultrasonic sensor 300 from FIG. 3 is constructed using a TFT substrate 306 comprising TFT pixels and various adhesives, air gaps, metal layers, glass layers, etc. Each of these layers inadvertently has (or "may have") variations when examined over a contiguous region and may result in variations in the sensing capability of each pixel or group of pixels. In addition, in low-cost manufacturing processes, there could be air bubbles in some of the materials, which would also result in variations in the signal detection capabilities for the pixels affected. As described in embodiments of the invention, such variations in the sensing of the pixels may result in varying response (i.e., output signal 304) for an input signal 302 and may be used in generating the identifier for the sensor.

Figure 4:
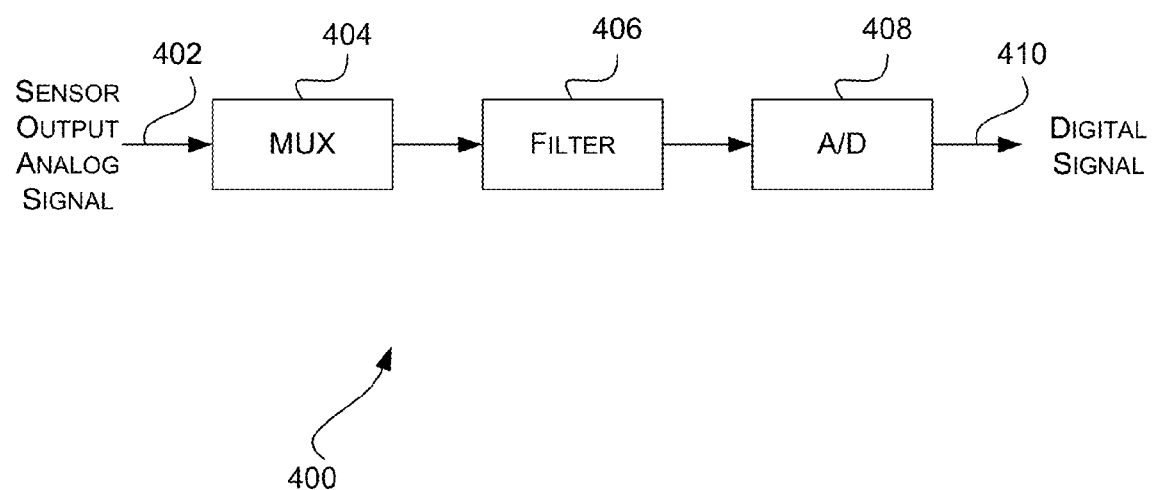
FIG. 4 illustrates an example representation of analog-to-digital conversion process for a sensor.

FIG. 4 illustrates an example representation of an analog-to-digital converter (ADC) 400 that illustrates the analog-to-digital conversion process for a sensor. The blocks depicted in FIG. 4 may represent some of the components of an example ADC 400, but embodiments of the invention are not limited by such a representation. The analog-to-digital process may also introduce some variations for each pixel or group of pixels. For example, the analog-to-digital conversion process may process sensor output analog signal 402 from a number of pixels (i.e., output signal 206) through the same circuit and generate a digital signal 410. In some embodiments, the same circuit or application specific integrated circuit (ASIC) may be used in the ADC process for multiple pixels. In one implementation, a multiplexer (i.e., MUX) 404 may be used for selecting the signals from the appropriate pixel circuit. The process of selecting the signals in the MUX 400 itself may introduce variations in the final sensing capability for a pixel. For example, cross-noise between the selecting signal and the signals in the MUX 400 may vary based on the signal selected. Furthermore, the signal from each pixel may have a slightly different route compared to the other signals leading to variations in the detecting of the signal. The circuitry for the filter 406 and the A/D 408 components may also introduce additional variations. As described in embodiments of the invention, such variations in the sensing of the pixels may be used in generating the identifier for the sensor.

Example variations described above are relatively quite stable over time for the same sensor. However, they may be different from other seemingly identical sensors produced even using the same manufacturing process. In other words, each sensor has its unique pixel variation.

Embodiments of the invention provide a method for generating an identifier using such detected variations for each pixel or a group of pixels. In one example embodiment, an ultrasonic sensor may be discussed. However, embodiments of the invention are not limited to an ultrasonic sensor and may be used with various other sensors.

Figure 5:
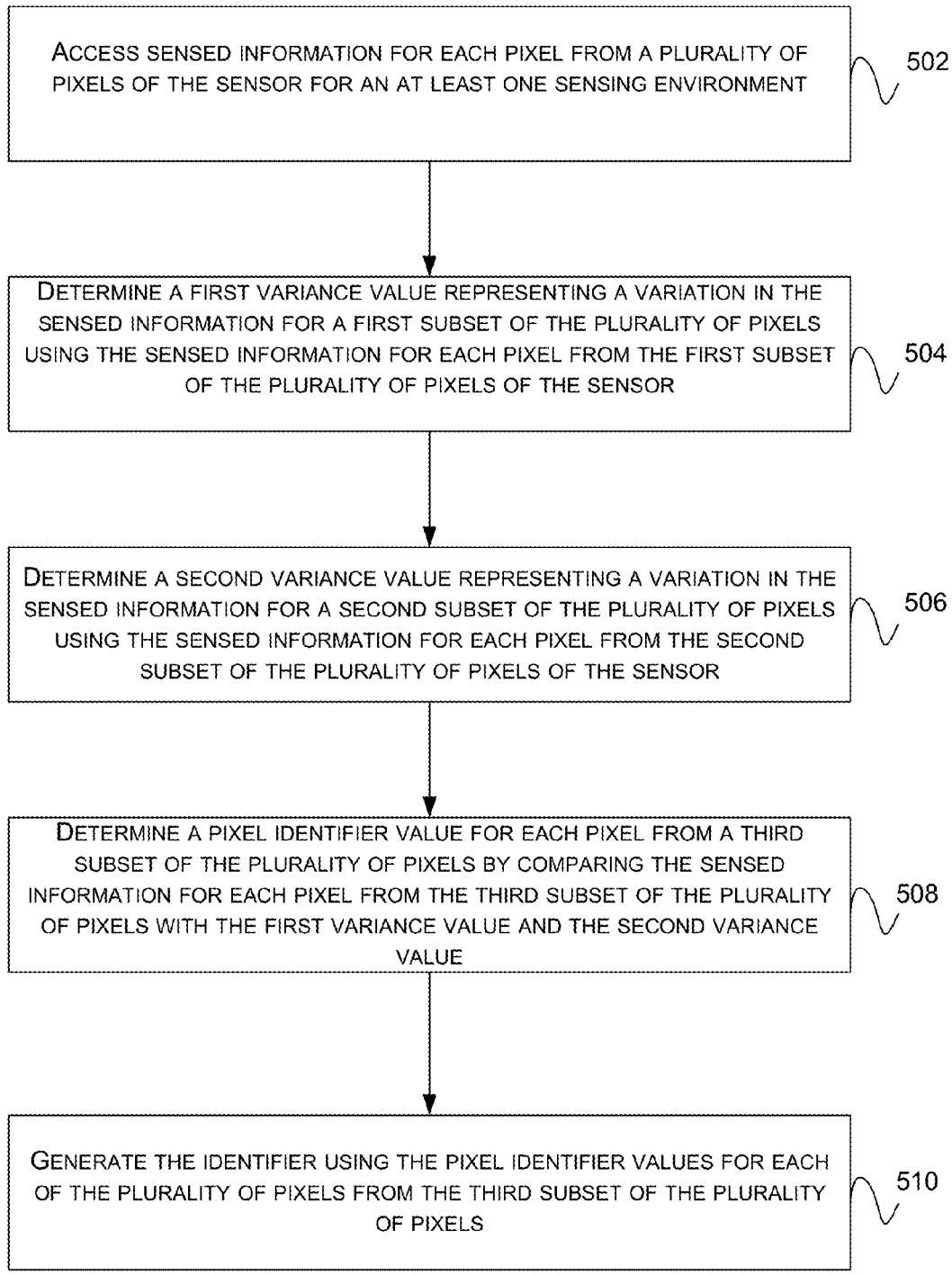
FIG. 5 illustrates a flow diagram for illustrating an example of a process for generating an identifier for a sensor.

FIG. 5 illustrates a flow diagram for performing a method for generating an identifier for a sensor, according to one or more embodiments of the invention. According to one or more aspects, any and/or all of the methods and/or method steps described in the flow diagram 500 illustrated in FIG. 5 may be implemented by and/or by a computing device, such as a mobile device. Illustrative but non-limiting components of such a computing device are described in greater detail in FIG. 14. In one embodiment, one or more of the method steps described below with respect to FIG. 5 are implemented by a processor or an application-specific integrated circuit (ASIC) of the mobile device, such as the processor 1410 or another processor. Additionally or alternatively, any and/or all of the methods and/or method steps described herein may be implemented in computer-readable instructions, such as computer-readable instructions stored on a computer-readable medium such as the memory 1435, storage 1425 or another computer readable medium.

In certain embodiments, multiple bits may be used to represent the variation associated with each pixel relative to other pixels and various sensing environments. In some instances, each bit may represent a different sensing environment associated with the same pixel. The reliability of the representation of the variability of the pixel may be increased by determining the variability of the pixel over a greater number of sensing environments.

For illustration purposes, in an example setting that uses an ultrasonic sensor, three different sensing environments may be selected. In the first example sensing environment (BG1) for the ultrasonic sensor, a normal DC bias with the tone burst generator disabled may be used. In the second example sensing environment (BG2) for the ultrasonic sensor, a normal DC bias with the tone burst generator enabled may be used. In the third example sensing environment (BG3) for the ultrasonic sensor, a normal DC bias shifted by 0.1 V with the tone burst generator disabled may be used. In one implementation, for the ultrasonic fingerprint sensor, the sensing may be performed without a finger present on the ultrasonic sensor.

The sensing environment may be selected based on the sensor type. For example, for a camera, the sensing environments may include sensing with no light, sensing with white light and sensing with red light.

At block 502, components of the computing device may access sensed information for each pixel from a plurality of pixels of the sensor for an at least one sensing environment. Sensed information may refer to an analog or digital signal detected for a sensor subjected to a particular sensing environment. In certain other embodiments, the method performs a scan of the sensor and accesses sensed information for each of the above described sensing environments to determine the measurement for each pixel under the different sensing environments.

In certain embodiments, multiple scans for the same sensing environment for the same pixels may be performed to normalize the data collected over multiple iterations. Performing multiple scans may increase the reliability of the data. Normalization of the data may be performed using a simple mean or a medium calculation over multiple iterations ($N_1$, $N_2$ and $N_3$). Following is an example equation representing three datasets for the absolute measurement values for the pixels for the sensors ($A_{BG1}$, $A_{BG2}$ and $A_{BG3}$) for the three different sensing environments (BG1, BG2 and BG3), respectively.

$$A_{BG1} = \frac{1}{N_1}\sum_{i=1}^{N_1} BG1_i, \; A_{BG2} = \frac{1}{N_2}\sum_{i=1}^{N_2} BG2_i, \text{ and } A_{BG3} = \frac{1}{N_3}\sum_{i=1}^{N_3} BG3_i$$

At block 504, components of the computing device may determine a first variance representing a variation in the sensed information for a first subset of the plurality of pixels using the sensed information for each pixel from the first subset of the plurality of pixels of the sensor. Blocks 602, 610 and 616 of FIGS. 6A, 6B and 6C, respectively, represent example subsets of pixels included in the first subset.

In one implementation, the first subset may refer to a global subset comprising sensed information for all of the pixels for the sensor. In such a scenario, the first variance may be referred to as a global variance. Such an implementation of the first subset may be depicted by block 602 of FIG. 6A, where the first subset includes all of the pixels of the sensor. However, as described in further detail below with respect to FIG. 6B and FIG. 6C, in some implementations, the first subset may not comprise all of the pixels of the sensor.

In certain aspects, the data set $A_{BG1}$ may include 64 different data points representing each pixel for the sensor 100 represented in FIG. 1. In one example, where the first subset represents a global subset and the first variance refers to a global variance, a mean and standard deviation ($\mu_1$, $\sigma_1$), ($\mu_2$, $\sigma_2$), and ($\mu_3$, $\sigma_3$) may be calculated for each dataset ($A_{BG1}$, $A_{BG2}$ and $A_{BG3}$) that may be used to represent the global variability of the sensor in their respective sensing environment (BG1, BG2 and BG3).

Briefly referring to FIG. 7, FIG. 7 illustrates the example process of generating a mean and standard deviation for multiple scans of the sensor. For example, multiple ($N_1$) scans may be performed and averaged to generate a single dataset associated with the plurality of pixels for a sensing environment ($A_{BG1}$). The dataset may be further processed to generate a mean and standard deviation to represent the variability of the first subset of pixels (global variance, where the first subset includes all the pixels of the sensor).

At block 506, components of the computing device may determine a second variance representing a variation in the sensed information for a second subset of the plurality of pixels using the sensed information for each pixel from the second subset of the plurality of pixels of the sensor, wherein the first subset of the plurality of pixels is different from the second subset of the plurality of pixels. Blocks 604, 612 and 618 of FIGS. 6A, 6B and 6C, respectively, represent example subsets of pixels included in the second subset.

In certain implementations, the pixels included in the second subset are determined by a remote computing device, such as a remote server, that may request an identifier from the computing device coupled to the sensor. In certain other implementations, the computing device may select a plurality of pixels (or location/region of the pixels) to be included in the second subset. In certain implementations, the pixels included in the second subset may be determined based on the design of the sensor or the ADC converter. For example, in one implementation, M bits may be selected for the second subset based on the transmission channel shared by multiple pixel circuits.

Similar to block 504, a second variance may be determined for a region of the sensor (second subset) using sensed information for those pixels. Determining multiple variances may provide the computing device, in block 508, multiple points for comparison for any particular pixel for the purpose of generating an identifier. At least in one implementation, all M pixels may be grouped together to calculate a second mean and second standard deviation ($\tilde{\mu}_1$, $\tilde{\sigma}_1$), ($\tilde{\mu}_2$, $\tilde{\sigma}_2$), and ($\tilde{\mu}_3$, $\tilde{\sigma}_3$).

Figure 8:
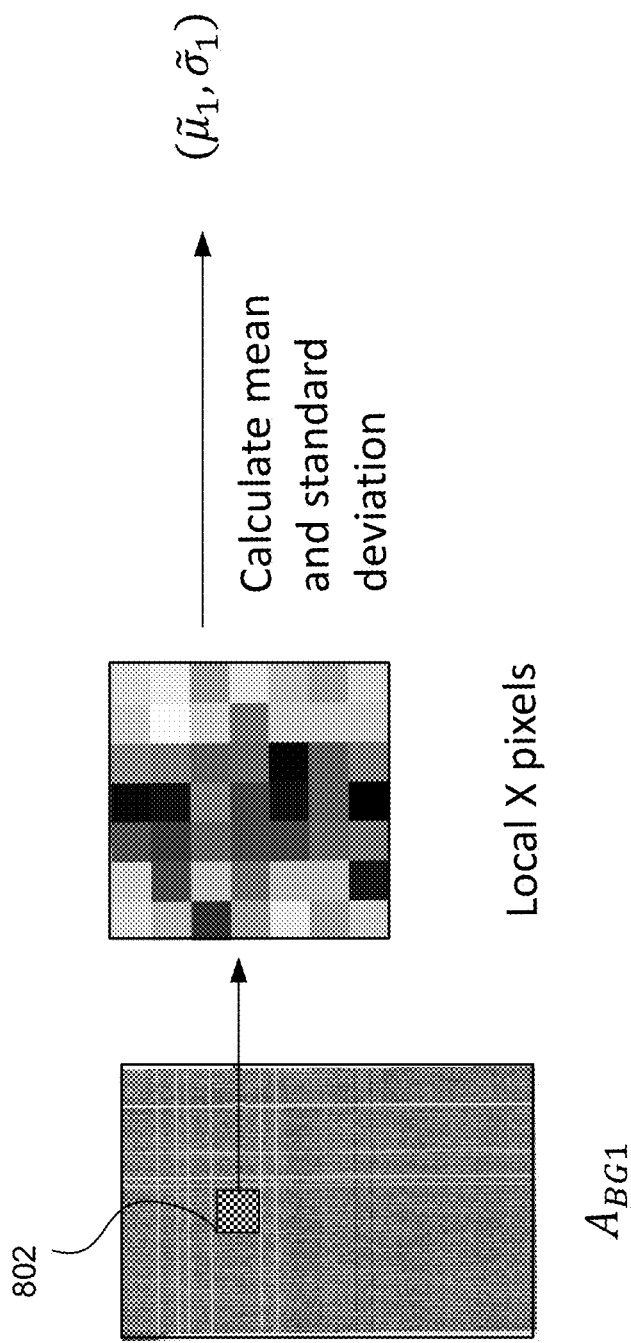
FIG. 8 illustrates an example process for generating a mean and standard deviation for a portion of the sensor.

Briefly referring to FIG. 8, FIG. 8 illustrates a similar process to FIG. 7, wherein the method generates a mean and standard deviation for a region that is a subset of the entire sensor. For example, a small region as indicated in FIG. 8 by the rectangular box 802 may be selected as the second subset from the dataset associated with the plurality of pixels for a sensing environment ($A_{BG1}$). The dataset may be further processed to generate a mean and standard deviation to represent the variability associated with the local region (local variability). In some instances, the identifier may be generated using information from the second subset of pixels. In such instances, the second subset of pixels may be referred to as the local subset and the second variance may be referred to as the local variance.

At block 508, components of the computing device may determine a pixel identifier value for each pixel from a third subset of the plurality of pixels by comparing the sensed information for each pixel from the third subset of the plurality of pixels with the first variance and the second variance. Blocks 606, 614 and 620 of FIGS. 6A, 6B and 6C, respectively, represent example subsets of pixels included in the third subset. In one implementation, the pixel identifier values may be a string of bits for each pixel from the third subset of the plurality of pixels and may be used in generating the identifier.

For example, in one implementation, the computing device may compare the measurements of the pixel to the first and second variances for each sensing environment. In one implementation, if the absolute measurement or sensed information of the pixel relative to the first (or second) measurements falls within an acceptable range (based on the mean and standard deviation), then a zero value may be assigned for the pixel for that sensing environment, and vice versa. The above example setting yields six bits of information representing the relative variability for each pixel, since there are three sensing environments (BG1, BG2 and BG3) and two groups of pixels (first and second subset) that the relativity of the current pixel is measured against. The following equations represent example generation of the six bit pixel identifier value representing the variability of each pixel. $\alpha$, $\beta$, $\gamma$, $\tilde{\alpha}$, $\tilde{\beta}$, and $\tilde{\gamma}$ are variables that may be used to tune the range of the acceptable variability from the mean or medium.

First bit=0: if $A_{BG1}(x, y) \in [\mu_1 - \alpha\sigma_1, \mu_1 + \alpha\sigma_1]$
  Otherwise, second bit=1.
Second bit=0: if $A_{BG2}(x, y) \in [\mu_2 - \beta\sigma_2, \mu_2 + \beta\sigma_2]$
  Otherwise, second bit=1.
Third bit=0: if $A_{BG3}(x, y) \in [\mu_3 - \Delta\sigma_3, \mu_3 + \gamma\sigma_3]$
  Otherwise, third bit=1.
Fourth bit=0: if $A_{BG1}(x, y) \in [\tilde{\mu}_1 - \tilde{\alpha}\tilde{\sigma}_1, \tilde{\mu}_1 + \tilde{\alpha}\tilde{\sigma}_1]$
  Otherwise, fourth bit=1.

Fifth bit=0: if $A_{BG2}(x, y) \in [\tilde{\mu}_2-\tilde{\beta}\tilde{\sigma}_2, \tilde{\mu}_2+\tilde{\beta}\tilde{\sigma}_2]$
   Otherwise, fifth bit=1.
Sixth bit=0: if $A_{BG3}(x, y) \in [\tilde{\mu}_3-\tilde{\gamma}\tilde{\sigma}_3, \tilde{\mu}_3+\tilde{\gamma}\tilde{\sigma}_3]$
   Otherwise, sixth bit=1.

Figure 9:
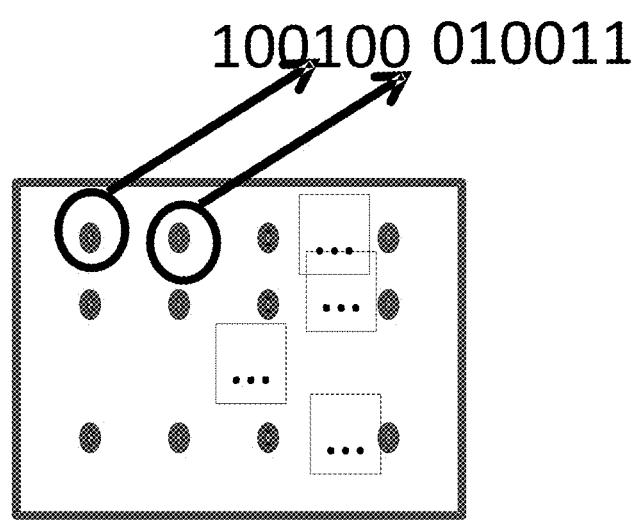
FIG. 9 illustrates an example representation of the identifier generated using pixel identifier values associated with a plurality of pixels.

At block 510, components of the computing device may generate the identifier using the pixel identifier values for each of the plurality of pixels from the third subset of the plurality of pixels. For example, as shown in FIG. 9, in one example, for X-by-Y pixels, 6XY bits for an identifier may be generated. In one simplistic example, the pixel identifier values for the plurality of pixels from the third subset may be concatenated to generate the identifier.

It should be appreciated that the specific steps illustrated in FIG. 5 provide a particular method of switching between modes of operation, according to an embodiment of the present invention. Other sequences of steps may also be performed accordingly in alternative embodiments. For example, alternative embodiments of the present invention may perform the steps/blocks outlined above in a different order. To illustrate, a user may choose to change from the third mode of operation to the first mode of operation, the fourth mode to the second mode, or any combination therebetween. Moreover, the individual steps/blocks illustrated in FIG. 5 may include multiple sub-steps that may be performed in various sequences as appropriate to the individual step. Furthermore, additional steps/blocks may be added or removed depending on the particular applications. One of ordinary skill in the art would recognize and appreciate many variations, modifications, and alternatives of the process.

Figure 6A:
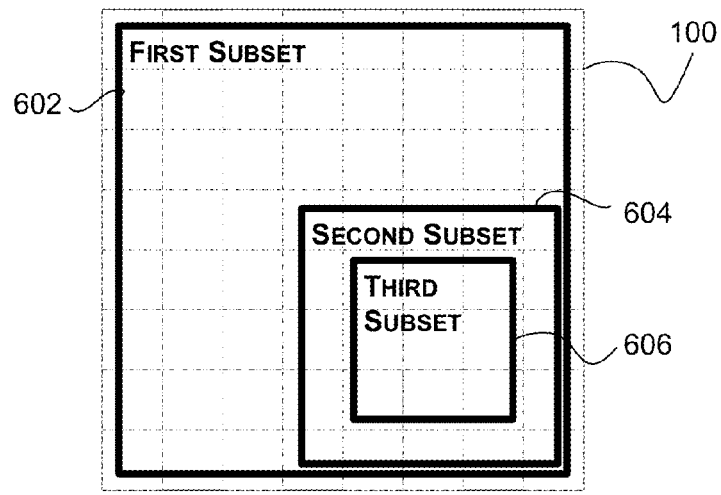
FIGS. 6A, 6B, and 6C illustrate three different configurations for a first subset of pixels, a second subset of pixels and a third subset of pixels used in generating an identifier in some aspects of the disclosure.
Figure 6B:
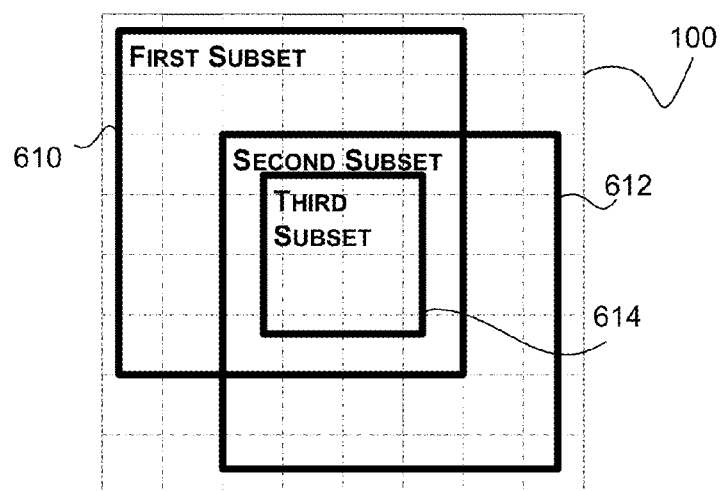
Figure 6C:
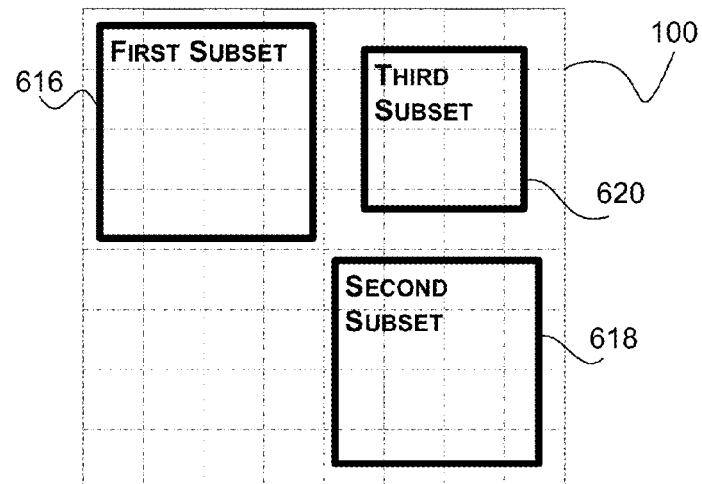

FIGS. 6A, 6B and 6C illustrate example variations of pixels included in a first subset, second subset and third subset from the plurality of pixels for a sensor. FIGS. 6A, 6B and 6C represent only a few different configurations for generating an identifier and embodiments of the invention are not limited by these configurations.

For example, in FIG. 6A, the first subset 602 includes all the pixels of the sensor and represents a global set. The second subset 604 represents a set different from the first subset 602, even though the pixels included in the second subset 604 are also included in the first subset 602. Since, the second subset 604 is different from the first subset 602, the converse is not true (i.e., the second subset 604 does not include all the pixels from the first subset 602). As shown in FIG. 6A, the pixels included in the third subset 606 are also included in the second subset 604. In one instance, the second subset 604 and the third subset 606 can be the same. When the second subset 604 and the third subset 606 are the same, the identifier is generated using pixel value identifiers for each pixel from the second/third subset 604.

FIG. 6B illustrates an example where the first subset 610 of pixels does not include all of the pixels from the sensor. Furthermore, in FIG. 6B, all the pixels from the second subset 612 are not included in the first subset 610. As shown in FIG. 6B, the pixels from the third subset 614 are included in the first subset 610 and the second subset 612 of pixels.

FIG. 6C illustrates yet another example configuration, where the first subset 616, the second subset 618 and the third subset 620 are all distinct subsets without any overlap in pixels.

Several such configurations can be constructed without departing from the scope of the invention. Selecting several such configurations, wherein the scope of each subset is variable in terms of coverage regions and the number of pixels, allows the computing device to generate a large number of different and sufficiently unique identifiers associated with the same sensor. In some implementations, in addition to a first subset and a second subset, additional subsets may be defined and used for generating multiple variances. Therefore, embodiments of the invention are not limited in scope to two variances and may use multiple variances for generating the identifier.

A second computing device, such as a trusted backend server, may also generate an identifier using the same configuration parameters used by the sensor in generating the identifier. By comparing the identifier generated by the computing device and the identifier generated locally, the second computing device can uniquely identify and/or authenticate the sensor used in the computing device.

In some aspects, the configuration for generating the identifier may be pre-negotiated between the two computing devices. In other aspects, the configuration for generating the identifier may be determined at the second computing device, such as the trusted backend server. In yet other aspects, the configuration for generating the identifier may be determined at the computing device coupled to the sensor.

In one example, the configuration information is determined and received from the second computing device, such as the trusted backend server. In another example, the configuration information may be determined independently by each of the two computing devices using a synchronized time stamp or shared seed/secret for a random number generator for the two devices.

The unique identifier may be useful to any (trusted or untrusted) remote device that may be interested in differentiating between multiple sensors. In addition, a backend server (such as a trusted server) may also have sensed information for each of the pixels for the sensor for the different sensing environments and the configuration used for generating the identifier by the computing device coupled to the sensor. Such a backend server may also generate the identifier and authenticate the sensor (i.e., determine not only that the sensor associated with the identifier is unique, but also that the sensor associated with the identifier is a particular sensor known (directly or indirectly) to the backend server).

Figure 10:
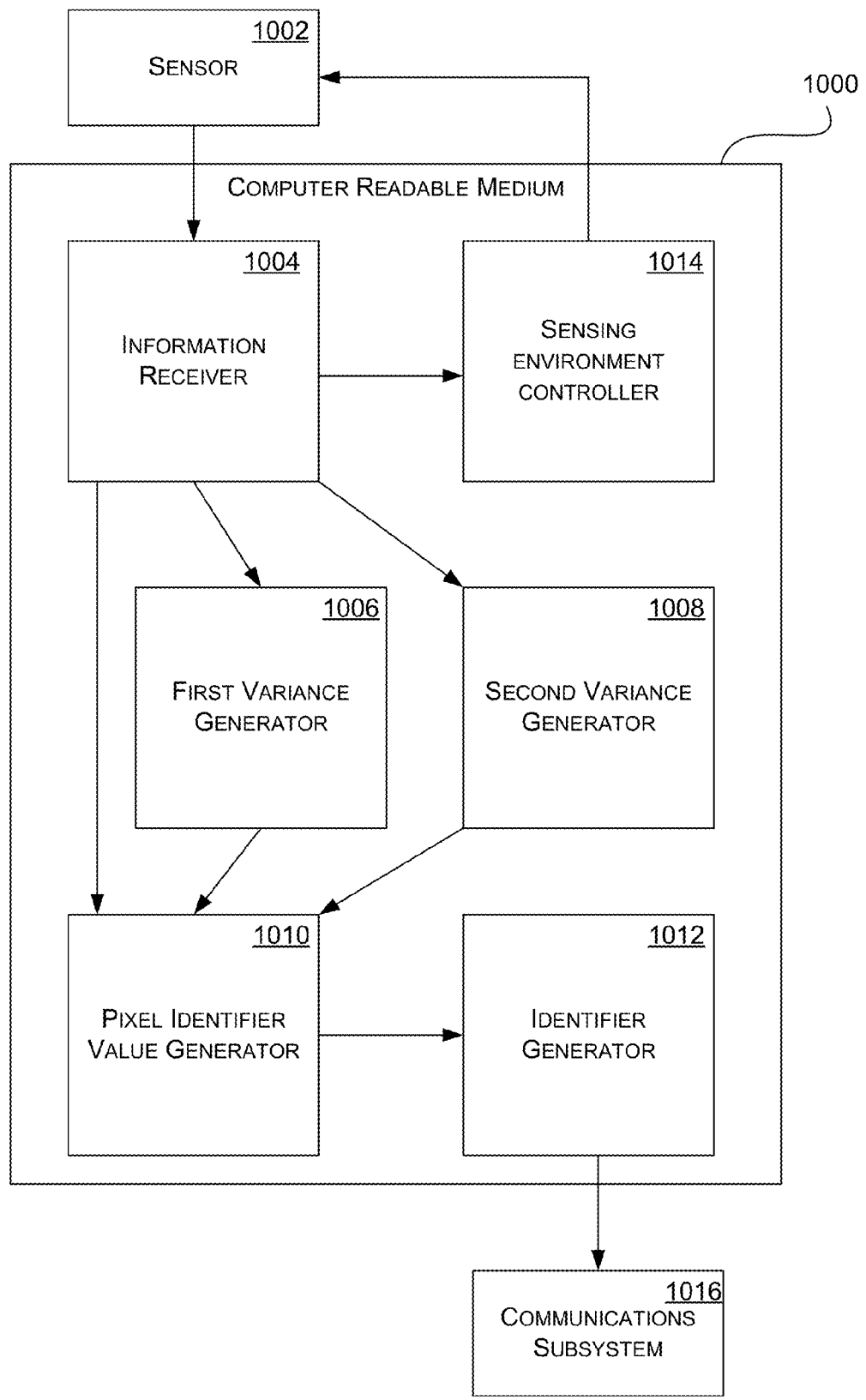
FIG. 10 illustrates a block diagram according to one or more aspects of the computing device coupled to the sensor.

FIG. 10 illustrates a block diagram for generating an identifier for a sensor by a computing device coupled to the sensor. The computing device may be a computing device implemented using one or more components described in FIG. 14. Modules described in FIG. 10 may be implemented using software, firmware, hardware or any other combination thereof. In one embodiment, some of the modules described in FIG. 10 may be stored as software modules on a computer-readable medium 1000 that may be any magnetic, electronic, optical, or other computer-readable storage medium. In one implementation, the computer-readable storage medium 1000 may include an information receiver 1004, first variance generator 1006, second variance generator 1008, pixel identifier generator 1010, identifier generator 1012 and sensing environment controller 1014.

At block 1004, the information receiver 1004 module may receive sensed information from the sensor 1002. In one implementation, the information receiver 1004 module may receive information for each of the pixels or "pixel circuits" associated with the sensor 1002 and store the sensed information in memory 1435. In one implementation, the information receiver may receive information for several different sensing environments and store the information associated with the sensor for different sensing environments in separate memory buffers.

In some implementations, the information receiver 1004 module may receive multiple iterations of information from the sensor 1002 for the same sensing environment (controlled by the sensing environment controller 1014 module). The information receiver 1004 module can average the data received over multiple iterations to reduce errors or temporary fluctuations in the measurements or sensing of the information. In one implementation, the information receiver 1004 module receives information for all the pixels of the sensors for each and every request for generation of a sensor identifier. In another implementation, the information receiver 1004 refreshes the stored information for the sensors operating in different sensing environments periodically and not on every request for generation of a sensor identifier.

At block 1014, the sensing environment controller 1014 module may select the various different sensing environments for the sensor 1002 for retrieving the sensed information. For illustration purposes, in an example setting that uses an ultrasonic sensor, three different sensing environments may be selected. In the first example, sensing environment (BG1) for the ultrasonic sensor, a normal dc bias with the tone burst generator disabled may be used. In the second example, sensing environment (BG2) for the ultrasonic sensor, a normal DC bias with the tone burst generator enabled may be used. In the third example, sensing environment (BG3) for the ultrasonic sensor, a normal DC bias shifted by 0.1 V with the tone burst generator disabled, may be used.

At block 1006, the first variance generator 1006 module uses information associated with the first subset and generates a first variance. In one implementation, the first subset includes all of the pixels of the sensor and the first variance represents the global variance. In one aspect, the first variance for a sensing environment may be generated by calculating a mean of the sensed information for each of the pixels belonging to the first subset and the standard deviation for the pixels belonging to the first subset. The first variance generator 1006 module may receive the sensed information for the first subset of pixels from the information receiver 1004 module.

At block 1008, the second variance generator 1008 module uses information associated with the second subset and generates a second variance. In one implementation, the second subset is different from the first subset in at least one pixel. In one aspect, the second variance for a sensing environment may be generated by calculating a mean of the sensed information for each of the pixels belonging to the second subset and the standard deviation for the pixels belonging to the second subset. The second variance generator 1008 module may receive the sensed information for the second subset of pixels from the information receiver 1004 module.

Although the first variance generator 1006 and the second variance generator 1008 are discussed, embodiments of the invention are not limited to generation of only two variances and several more variances may be generated in certain embodiments.

At block 1010, the pixel identifier value generator 1010 module may generate a value associated with a pixel that identifies the pixel. In one aspect, the pixel identifier value generator 1010 module may select one pixel from a third subset of pixels for generating the pixel identifier value. The pixel identifier value generator 1010 module may compare the sensed information for the pixel against the first variance generated by the first variance generator 1006 module to generate one bit of information. Similarly, the pixel identifier value generator 1010 module may compare the sensed information for the same pixel against the second variance generated by the second variance generator 1008 module to generate a second bit of information. Similarly, if the first variance and the second variance are generated for several different sensing environments, the pixel identifier value generator 1010 module can generate a bit of information for each of those sensing environments. For example, if three different sensing environments may be configured by the sensing environment controller 1014 module, then six different bits of information may be generated for a single pixel from the third subset.

The pixel identifier value generator 1010 module may repeat the same process for each pixel from the third subset of pixels. At block 1012, the identifier generator module may combine the pixel identifier values for each of the pixels from the third subset and generate an identifier for the sensor 1002. In one implementation, the sensor identifier may be sent to a device, such as a remote device using a communication subsystem 1016 similar to the communication subsystem 1430 described in FIG. 14.

Figure 11:
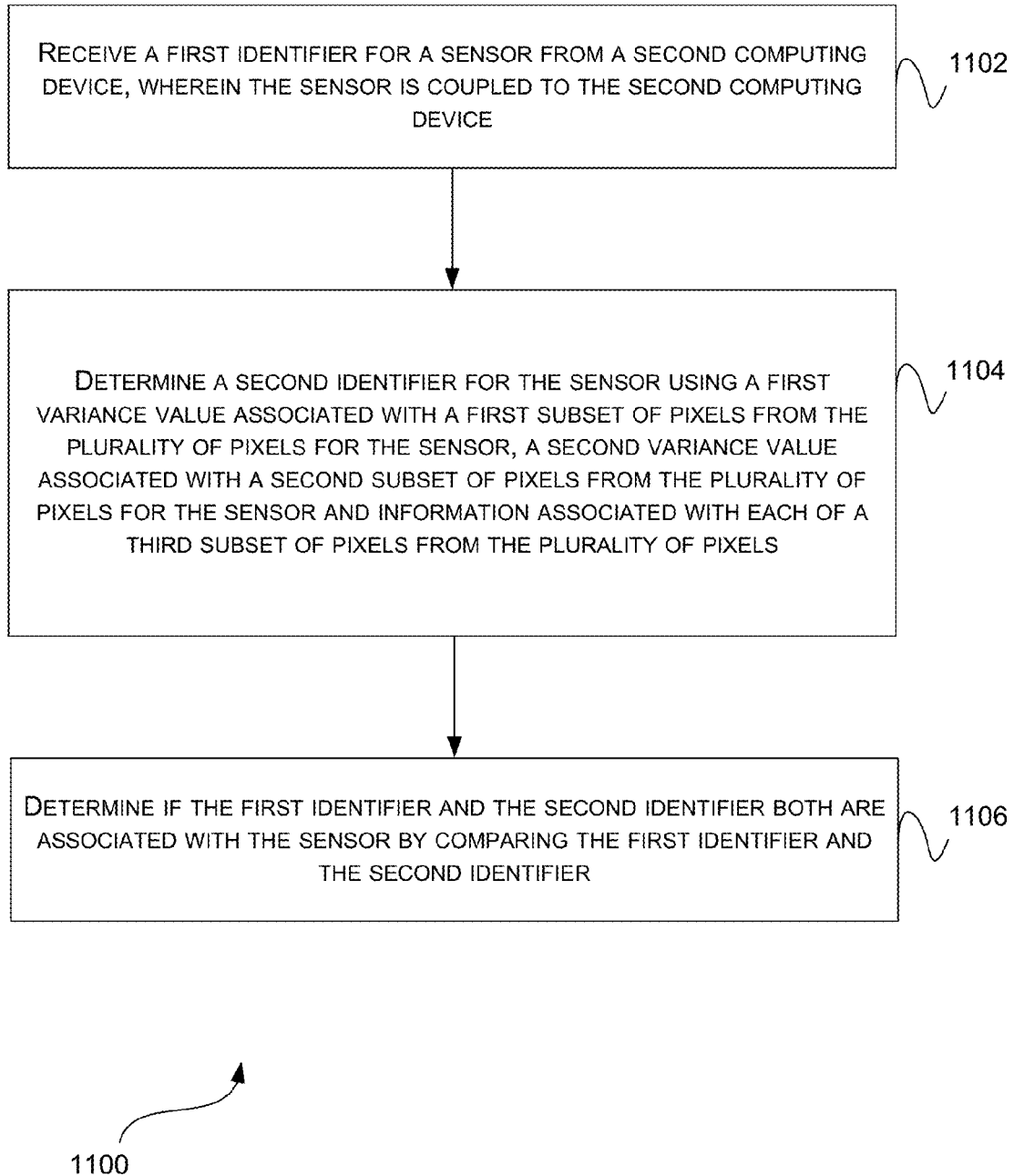
FIG. 11 illustrates a flow diagram for performing a method according to one or more aspects of the disclosure, as performed by an authentication computing device.

FIG. 11 illustrates a flow diagram for performing a method, by an authentication computing device, according to one or more embodiments of the invention. According to one or more aspects, any and/or all of the methods and/or method steps described in the flow diagram 1100 illustrated in FIG. 11 may be implemented by and/or in a computing device. In one example, the computing device is a remote device, such as a trusted backend server that authenticates the identity of the sensor. In another example, the computing device is a secondary device or portable dongle with computing logic for establishing the authenticity of the sensor. Illustrative but non-limiting components of such a computing device are described in greater detail in FIG. 14. In one embodiment, one or more of the method steps described below with respect to FIG. 11 are implemented by a processor or an application specific integrated circuit (ASIC) of the mobile device, such as the processor 1410 or another processor. Additionally or alternatively, any and/or all of the methods and/or method steps described herein may be implemented in computer-readable instructions, such as computer-readable instructions stored on a computer-readable medium such as the memory 1435, storage 1425 or another computer readable medium.

At block 1102, components of an authentication computing device may be configured to receive (using a communications subsystem 1430) a first identifier associated with a sensor from a computing device, wherein the sensor is coupled to the computing device.

At block 1104, components of the authentication computing device may determine a second identifier for the sensor using a first variance associated with a first subset of pixels from the plurality of pixels for the sensor, a second variance associated with a second subset of pixels from the plurality of pixels for the sensor and information associated with each of a third subset of pixels from the plurality of pixels. The second identifier may be generated using information stored in the memory 1435 of the authentication computing device or a device coupled to the server computing device. In one implementation, during a provisioning phase, the sensed information associated with the pixels of the sensors operating under different sensing environments may be stored on the server computing device or a device coupled to the first computing device.

The process of generating the second identifier may be similar in some aspects to the process of generating the first identifier (described with reference to FIG. 5). The first subset, the second subset and the third subset of pixels used in generating the identifier may be pre-negotiated between the authentication computing device and the computing device coupled to the sensor.

At block 1106, components of the authentication computing device may determine if the first identifier and the second identifier both are associated with the same sensor by comparing the first identifier and the second identifier. In certain embodiments, comparing the first identifier and the second identifier for determining if the first identifier and the second identifier are both associated with the same sensor may include determining a distance between the first identifier and the second identifier, and determining that the first identifier and the second identifier are both associated with the sensor if the distance is shorter than a threshold.

During the process of authentication or identification, in some implementations, components of the authentication computing device may use a hamming distance algorithm in comparing the first identifier received by the server computing device (D1) against the second identifier generated by the authentication computing device (D2), as shown below.

$$h = \frac{1}{6XY}\sum (D_1 \ XOR \ D_2)$$

In one implementation, if h is smaller than a matching threshold T, the sensor will be authenticated or identified as the same sensor associated with identifier D2. Otherwise, the sensor may not be authenticated or identified as expected sensor. Use of the hamming distance algorithm (or any similar algorithm) allows for flexibility and variability in the identifier that may be caused by minor defects in the sensor and variance in measurements due to environmental noise.

Furthermore, the identification accuracy may be increased by creating a mask for each sensor ID. For instance, the mask value at each pixel may be set as "000000" for a defective pixel. Otherwise, the mask may default to "111111" for a six bit representation of a pixel. The hamming distance algorithm may be revised from above as follows to account for masks:

$$h = \frac{=\sum (D_1 \ AND \ M_1) XOR(D_2 \ AND \ M_2)}{\sum M_1 \ AND \ M_2}.$$

In some embodiments, the sensor identifier may be encrypted before transmitting the identifier to a remote entity.

It should be appreciated that the specific steps illustrated in FIG. 11 provide a particular method of switching between modes of operation, according to an embodiment of the present invention. Other sequences of steps may also be performed accordingly in alternative embodiments. For example, alternative embodiments of the present invention may perform the steps/blocks outlined above in a different order. To illustrate, a user may choose to change from the third mode of operation to the first mode of operation, the fourth mode to the second mode, or any combination therebetween. Moreover, the individual steps/blocks illustrated in FIG. 11 may include multiple sub-steps that may be performed in various sequences as appropriate to the individual step. Furthermore, additional steps/blocks may be added or removed depending on the particular applications. One of ordinary skill in the art would recognize and appreciate many variations, modifications, and alternatives of the process.

Figure 12:
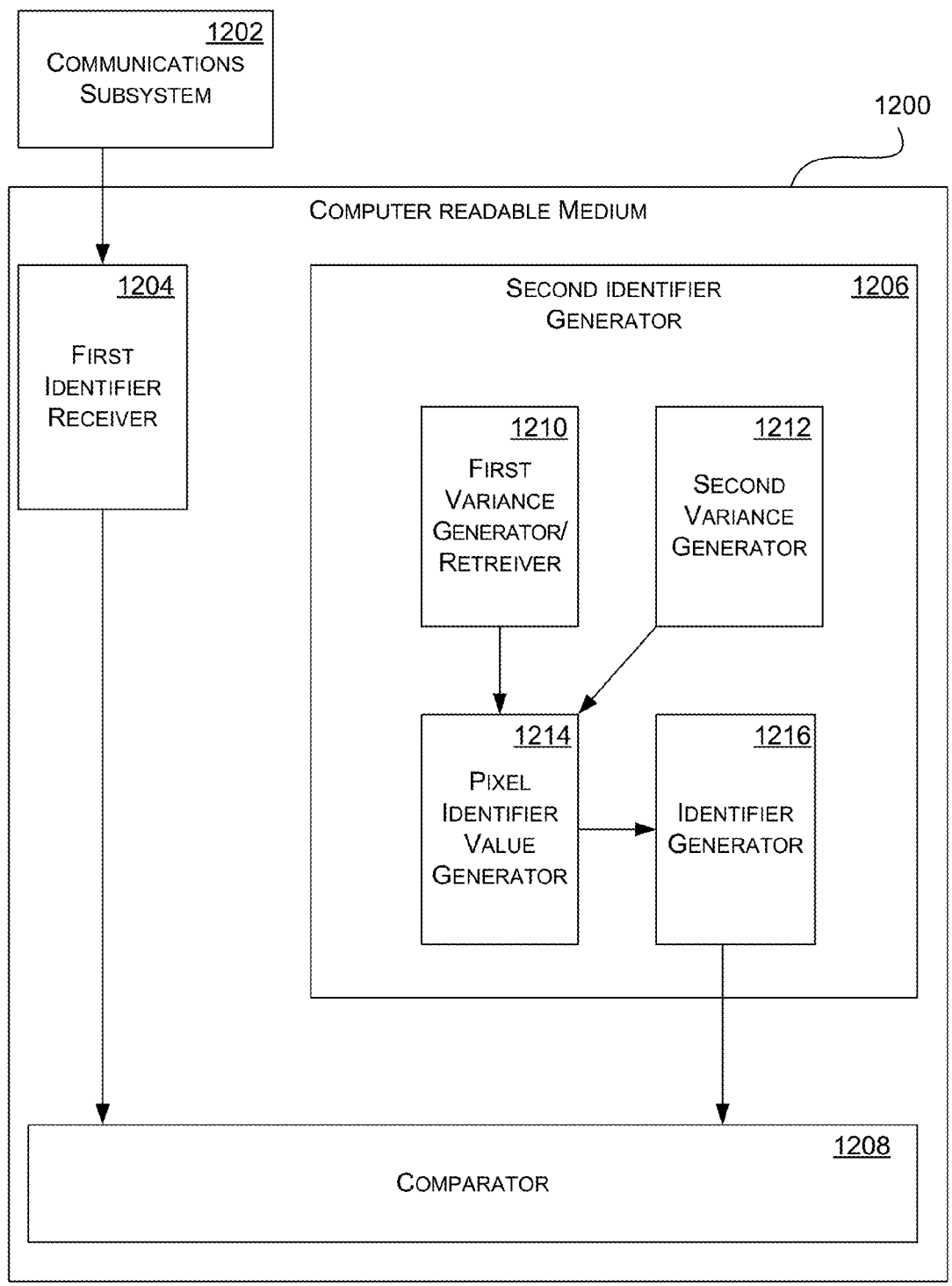
FIG. 12 illustrates a block diagram according to one or more aspects of the authentication computing device.

FIG. 12 illustrates a block diagram for authenticating an identifier for a sensor by an authentication computing device. The authentication computing device may be a computing device implemented using one or more components described in FIG. 14. Modules described in FIG. 12 may be implemented using software, firmware, hardware or any other combination thereof. In one embodiment, some of the modules described in FIG. 12 may be stored as software modules on a computer-readable medium 1200 that may be any magnetic, electronic, optical, or other computer-readable storage medium. In one implementation, the computer-readable storage medium 1200 may include a first identifier receiver 1204, a second identifier generator 1206, and a comparator 1208. The second identifier generator 1206 may include a first variance generator/retriever 1210, a second variance generator 1212, a pixel identifier value generator 1214 and an identifier generator 1216.

In some embodiments, during a provisioning phase, an authentication computing device or a device coupled to the server computing device may receive sensed information associated with a sensor that is stored in memory 1435 and used by the server computing device to authenticate the sensor. For example, in one embodiment, the information for a sensor may be acquired during the manufacturing or testing phase of the sensor and stored and accessible by the authentication computing device.

At the time of authenticating the sensor, the communications subsystem 1202 coupled to the authentication computing device may receive a first identifier associated with a sensor from a device coupled to the sensor, using a transceiver. At block 1204, the first identifier receiver 1204 may receive the first identifier at the authentication computing device and store it in memory 1435.

The second identifier generator 1206 module may generate the second identifier using sensed information for the sensor stored at the authentication computing device or a device coupled to the authentication computing device. In one embodiment, the sensed information stored may include sensed information for a multiple sensing environments. The authentication computing device and the computing device coupled to the sensor may also have the same configuration information regarding the first subset, second subset and third subset of pixels for generating the identifier for the sensor. The configuration information may be determined by the server computing device, the device coupled to the sensor or a combination of the two.

Similar to what has been described with reference to FIG. 5, the first variance generator/retriever 1210 may generate the first variance using the sensed information for the first subset of pixels from the plurality of pixels for the sensor. In one implementation, the first variance is generated by one or more processors 1410, by determining the mean and standard deviation for the sensed information for a sensing environment for the pixels belonging to a the first subset. In certain implementations, the first subset includes all of the pixels for the sensor. In certain aspects, the first variance is the global variance and may be determined once and/or periodically refreshed and not upon each and every authentication request.

At the second variance generator 1212 module, the authentication computing device may generate a second variance using the sensed information for the second subset of pixels from the plurality of pixels for the sensor. In one implementation, the second variance is generated by one or more processors 1410, by determining the mean and standard deviation for the sensed information for a sensing environment for the pixels belonging to the second subset.

At the pixel identifier value generator 1214 module, the sensed information for each pixel from a third subset of pixels is compared against the first variance and the second variance for each sensing environment to generate the pixel identifier values for the pixels from the third subset.

At the identifier generator 1216, the second identifier is generated by using the pixel identifier values generated by the pixel identifier value generator 1214 module for the pixels for the third subset of pixels. In one simple implementation, the pixel identifier values are concatenated to form the second identifier value.

The comparator 1208 module compares the first identifier value received from the first identifier receiver 1204 module and the second identifier value received from the second identifier generator 1206 module and determines if the two identifier values refer to the same sensor. If the two identifier values are determined to refer to the same sensor module, the authentication process on the server computing device passes.

Figure 13:
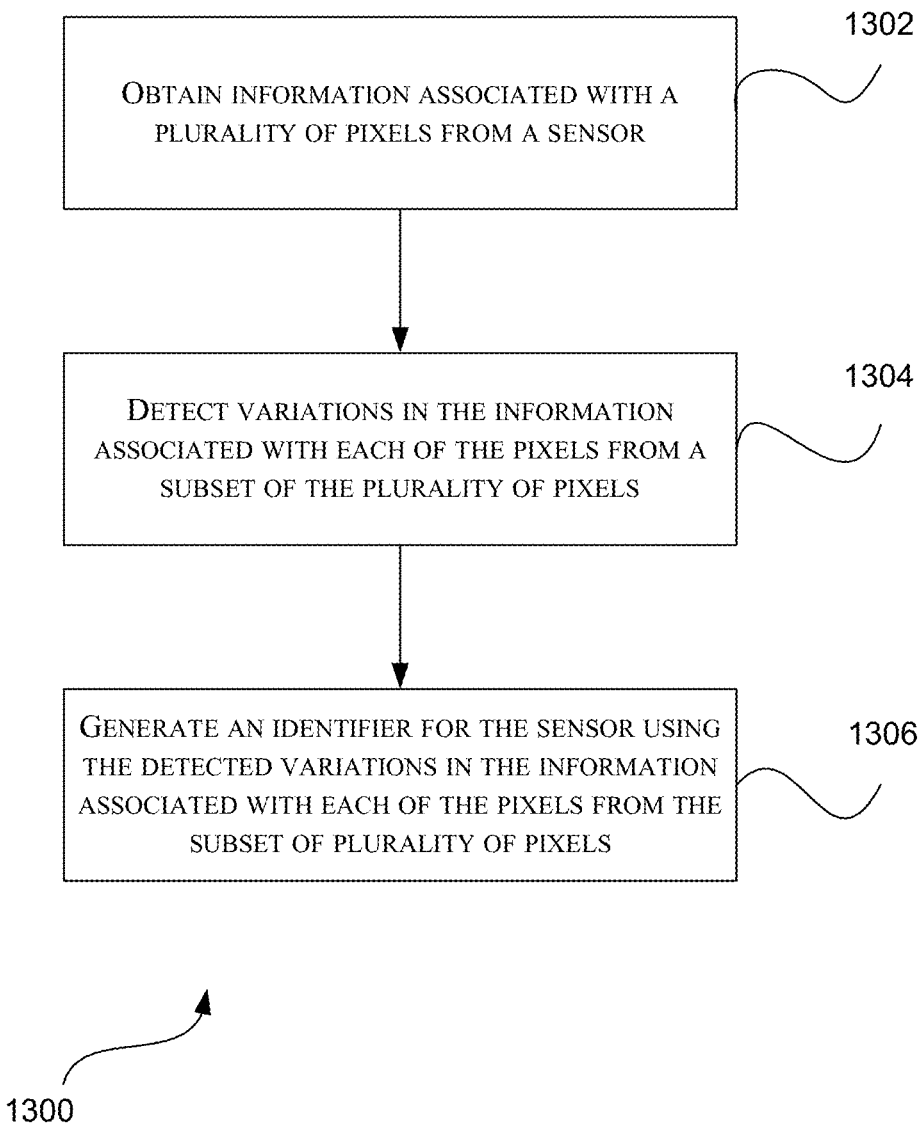
FIG. 13 illustrates another flow diagram for illustrating an example of a process for generating an identifier for a sensor.

FIG. 13 illustrates a flow diagram for performing a method according to one or more embodiments of the invention. According to one or more aspects, any and/or all of the methods, and/or method steps described in the flow diagram 1300 illustrated in FIG. 13, may be implemented by and/or in an mobile device, components of which are described in greater detail in FIG. 14, for instance. In one embodiment, one or more of the blocks described below with respect to FIG. 13 are implemented by a processor or an ASIC of the mobile device, such as the processor 1410 or another processor. Additionally or alternatively, any and/or all of the methods and/or method steps described herein may be implemented in computer-readable instructions, such as computer-readable instructions stored on a computer-readable medium such as the memory 1435, storage 1425 or another computer readable medium.

At block 1302, components of the computing device may obtain information associated with a plurality of pixels from a sensor. In one embodiment, the sensor may be an image sensor. In another embodiment, the sensor may be an ultrasound sensor. In yet another embodiment, the sensor may be an ultrasound fingerprint sensor. In certain embodiments, the sensor may be used for authenticating a user using biometric information. In one embodiment, a mean and standard deviation may be generated using the information associated with the plurality of pixels from the sensor for various sensing environments.

At block 1304, components of the computing device may detect variations in the information associated with each of the pixels from a subset of the plurality of pixels. In one embodiment, the variation for each of the pixels is determined respective to the variations of the plurality of pixels. In another embodiment, components of the invention detect intrinsic variations in the produced information associated for each of the pixels from one or more subsets of the plurality of pixels; if two more subsets are used, they may or may not overlap but any two subsets are not exactly the same.

At block 1306, components of the computing device may generate an identifier for the sensor using the detected variations in the information associated with each of the pixels from the subset of plurality of pixels. In one embodiment, generating the identifier for the sensor may include calculating a variance for each of the pixels from the subset of a plurality of pixels, and generating the identifier using the variance associated with each of the pixels from the subset of plurality of pixels. In another embodiment, components of the embodiment may generate an identifier for the sensor using the detected intrinsic variations in the produced information associated with each of the pixels from the subset(s) of plurality of pixels. Furthermore, in one embodiment, generating the identifier value comprises concatenating the variances for the each of the plurality of pixels to generate the identifier. The variance for each of the pixels may be determined using multiple sensing environments for the sensor.

The variations in the sensing capability of the pixels may be caused by a variety of reasons that may include variation in the circuit for each pixel, wherein the variation in the circuit may be introduced by the manufacturing process, variation in material distributions for and around each pixel, air bubbles in the material distributions of each pixel and selection and transmission logic in the ADC conversion process.

It should be appreciated that the specific steps illustrated in FIG. 13 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination therebetween. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

The described techniques allow a sensor identifier computational method for ultrasound fingerprint sensors that is applicable to many types of sensors. The method detects abnormality (or variability) of a pixel sensing capability relative to other pixels to generate the value for that pixel. In one embodiment, the relative difference between the pixel to the global area (or larger area) and the relative difference between the pixel to the local area (or a small area) may be used to determine variability of the pixel. The difference may be classified into two categories: within a pre-defined normal range or not within a pre-defined normal range based the statistical analysis of the area. In some embodiments, only one scan or image may be used to generate this identifier, or in other embodiments, multiple scans or images may be used to generate the identifier.

The described techniques also allow for sensor identifier generation to adapt to gradual changes of the sensor and even damages of the sensor. In one embodiment, this may be accomplished by using masks to mask out defects and take the mask into account while determining the hamming distance, as described above. This may still achieve high verification/authentication accuracy.

Moreover, even in instances where the sensor has gradual changes or degradation over time, the identifier generated at the computing device may still match the identifier by a remote device, since the identifier is generated based on relative changes of the sensing capacity of a pixel relative to other pixels and not as an absolute measurement for the pixels.

Furthermore, the described techniques allow for generation of a flexible identifier, since an identifier may be generated using the entire sensor pixels, small area(s) of the sensors, and/or random discrete locations of the sensors, as described in the various configurations depicted in FIGS. 6A, 6B and 6C. Such variation in the generation of identifiers for a sensor can be used for generating a very large number of sufficiently unique identifiers that are associated with the sensor and can be authenticated by a remote device, such as a remote trusted backend server. Generation of identifiers in such large numbers can help thwart man-in-the middle attacks, since the computing device coupled to the sensor can continuously change the identifiers relayed by the computing device to a remote device.

Similarly, generation of such a large number of identifiers that are verifiable by a remote computing device also enables challenge response approaches and a one-time identifier approach and makes the random sensor verification/authentication very secure. For example, the remote server may have sensed information for all the pixels of the sensor. Such sensed information may be provisioned during a provisioning phase. When performing on-line authentication, the remote server may request/challenge the sensor (or computing device coupled to the sensor) for an identifier for a one-time selected configuration (comprising first subset, second subset and third subset) or location of the sensor, and the sensor may generate the identifier bits for this configuration challenge request and send the identifier for remote authentication/verification. One-time authentication/verification capability may greatly strengthen the security.

Embodiments of the invention may also allow for greater computational and transmission efficiency. In one example, if a sensor has 20-by-20 pixels, some implementations may have 400 pixels. If, each time, 100 pixels were required to generate the one-time ID, the described techniques can generate over $2 \times 10^{254}$ identifiers, providing many one-time IDs for the sensor.

Furthermore, the described technique can generate an identifier of varied length for the same sensor at different times for verification/authentication, allowing the same sensor identifier to adapt to different security and authentication needs.

Figure 14:
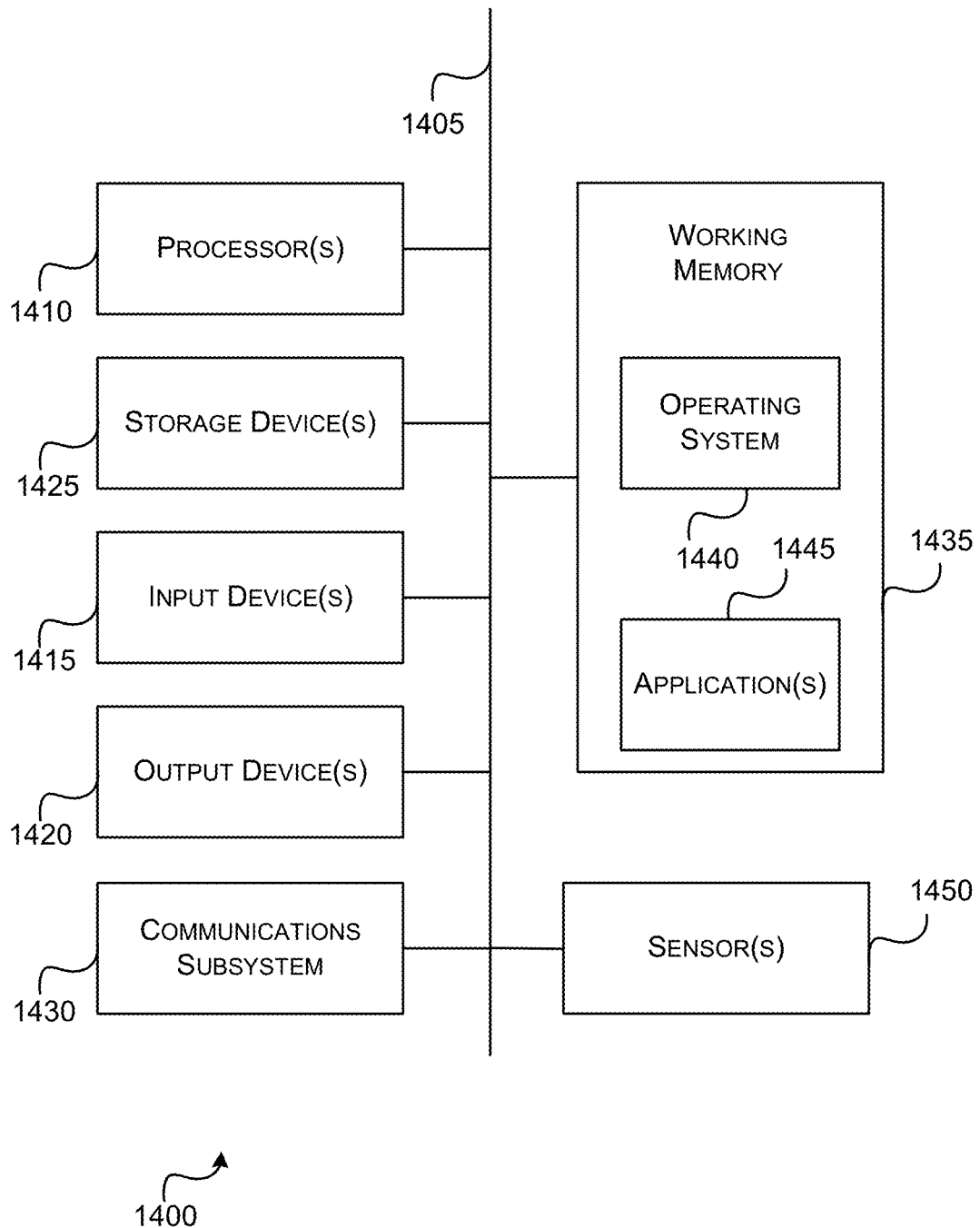
FIG. 14 illustrates an example of a computing device for implementing one or more aspects of the disclosure.

FIG. 14 illustrates an example computing device incorporating parts of the device employed in practicing embodiments of the invention. A computing device as illustrated in FIG. 14 may be incorporated as part of any computerized system, herein. For example, computing device 1400 may represent some of the components of a mobile device. Examples of a computing device 1400 include, but are not limited to, desktops, workstations, personal computers, supercomputers, video game consoles, tablets, smart phones, laptops, netbooks, or other portable devices. FIG. 14 provides a schematic illustration of one embodiment of a computing device 1400 that may perform the methods provided by various other embodiments, as described herein, and/or may function as the host computing device, a remote kiosk/terminal, a point-of-sale device, a mobile multifunction device, a set-top box and/or a computing device. FIG. 14 is meant only to provide a generalized illustration of various components, any or all of which may be utilized as appropriate. FIG. 14, therefore, broadly illustrates how individual system elements may be implemented in a relatively separated or relatively more integrated manner.

The computing device 1400 is shown comprising hardware elements that may be electrically coupled via a bus 1405 (or may otherwise be in communication, as appropriate). The hardware elements may include one or more processors 1410, including without limitation one or more general-purpose processors and/or one or more special-purpose processors (such as digital signal processing chips, graphics acceleration processors, and/or the like); one or more input devices 1415, which may include without limitation a camera, sensors 1450, a mouse, a keyboard and/or the like; and one or more output devices 1420, which may include without limitation a display unit, a printer and/or the like. Sensors may include ultrasonic sensors and/or other imaging sensors.

The computing device 1400 may further include (and/or be in communication with) one or more non-transitory storage devices 1425, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including without limitation, various file systems, database structures, and/or the like.

The computing device 1400 might also include a communications subsystem 1430. The communications subsystem 1430 may include a transceiver for receiving and transmitting data or a wired and/or wireless medium. The communications subsystem 1430 may also include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1430 may permit data to be exchanged with a network (such as the network described below, to name one example), other computing devices, and/or any other devices described herein. In many embodiments, the computing device 1400 will further comprise a non-transitory working memory 1435, which may include a RAM or ROM device, as described above.

The computing device 1400 may comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as the storage device(s) 1425 described above. In some cases, the storage medium might be incorporated within a computing device, such as computing device 1400. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by the computing device 1400 and/or might take the form of source and/or installable code, which, upon compilation and/or installation on the computing device 1400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 1400 such as network input/output devices may be employed.

Some embodiments may employ a computing device (such as the computing device 1400) to perform methods in accordance with the disclosure. For example, some or all of the procedures of the described methods may be performed by the computing device 1400 in response to processor 1410 executing one or more sequences of one or more instructions (which might be incorporated into the operating system 1440 and/or other code, such as an application program 1445) contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processor(s) 1410 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 1400, various computer-readable media might be involved in providing instructions/code to processor(s) 1410 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as the storage device(s) 1425. Volatile media include, without limitation, dynamic memory, such as the working memory 1435. Transmission media include, without limitation, coaxial cables, copper wire and fiber optics, including the wires that comprise the bus 1405, as well as the various components of the communications subsystem 1430 (and/or the media by which the communications subsystem 1430 provides communication with other devices). Hence, transmission media may also take the form of waves (including without limitation radio, acoustic and/or light waves, such as those generated during radio-wave and infrared data communications). In an alternate embodiment, event-driven components and devices, such as cameras, may be used, where some of the processing may be performed in analog domain.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer may read instructions and/or code.

Various forms of computer-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 1400. These signals, which might be in the form of electromagnetic signals, acoustic signals, optical signals and/or the like, are all examples of carrier waves on which instructions may be encoded, in accordance with various embodiments of the invention.

The communications subsystem 1430 (and/or components thereof) generally will receive the signals, and the bus 1405 then might carry the signals (and/or the data, instructions, etc. carried by the signals) to the working memory 1435, from which the processor(s) 1410 retrieves and executes the instructions. The instructions received by the working memory 1435 may optionally be stored on a non-transitory storage device 1425 either before or after execution by the processor(s) 1410.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for generating an identifier for a sensor, comprising:
    accessing, by a computing device, sensed information for each pixel from a plurality of pixels of the sensor for an at least one sensing environment;
    determining, by the computing device, a first variance representing a variation in the sensed information for a first subset of the plurality of pixels using the sensed information for each pixel from the first subset of the plurality of pixels of the sensor;
    determining, by the computing device, a second variance representing a variation in the sensed information for a second subset of the plurality of pixels using the sensed information for each pixel from the second subset of the plurality of pixels of the sensor, wherein the first subset of the plurality of pixels is different from the second subset of the plurality of pixels;
    determining, by the computing device, a pixel identifier value for each pixel from a third subset of the plurality of pixels by comparing the sensed information for each pixel from the third subset of the plurality of pixels with the first variance and the second variance; and generating, by the computing device, the identifier using the pixel identifier values for each of the plurality of pixels from the third subset of the plurality of pixels.

2. The method of claim 1, wherein the plurality of pixels from the third subset also belong to the first subset and the second subset.

3. The method of claim 1, wherein the plurality of pixels from the second subset also belong to the first subset.

4. The method of claim 1, further comprising determining the pixel identifier value for each pixel from the third subset of the plurality of pixels by receiving the sensed information for a plurality of sensing environments.

5. The method of claim 1, wherein the at least one sensing environment is one or more of sensing configurations comprising the bias current enabled, bias current disabled, bias current shifted, tone burst enabled, and tone burst disabled.

6. The method of claim 1, wherein generating the identifier value comprises concatenating the pixel identifier values for the plurality of pixels from the third subset of the plurality of pixels.

7. The method of claim 1, wherein the plurality of pixels belonging to the second subset is received by the computing device coupled to the sensor from a remote device.

8. The method of claim 1, wherein the sensor is an image sensor.

9. The method of claim 1, wherein the sensor is an ultrasonic sensor.

10. The method of claim 1, wherein the sensor is an ultrasonic fingerprint sensor.

11. The method of claim 1, wherein the identifier is a one-time sensor identifier.

12. A device for generating an identifier for a sensor, comprising:
the sensor coupled to the device, the sensor comprising a plurality of pixels configured to sense information;
a memory;
a processor coupled to the memory and configured to:
receive the sensed information for each pixel from the plurality of pixels of the sensor for an at least one sensing environment;
determine a first variance representing a variation in the sensed information for a first subset of the plurality of pixels using the sensed information for each pixel from the first subset of the plurality of pixels of the sensor;
determine a second variance representing a variation in the sensed information for a second subset of the plurality of pixels using the sensed information for each pixel from the second subset of the plurality of pixels of the sensor, wherein the first subset of the plurality of pixels is different from the second subset of the plurality of pixels;
determine a pixel identifier value for each pixel from a third subset of the plurality of pixels by comparing the sensed information for each pixel from the third subset of the plurality of pixels with the first variance and the second variance; and
generate the identifier using the pixel identifier values for each of the plurality of pixels from the third subset of the plurality of pixels.

13. The device of claim 12, wherein the plurality of pixels from the third subset also belong to the first subset and the second subset.

14. The device of claim 12, wherein the plurality of pixels from the second subset also belong to the first subset.

15. The device of claim 12, further comprising determining the pixel identifier value for each pixel from the third subset of the plurality of pixels by receiving the sensed information for a plurality of sensing environments.

16. The device of claim 12, wherein the at least one sensing environment is one or more of sensing configurations comprising the bias current enabled, bias current disabled, bias current shifted, tone burst enabled, and tone burst disabled.

17. The device of claim 12, wherein generating the identifier value comprises concatenating the pixel identifier values for the plurality of pixels from the third subset of the plurality of pixels.

18. The device of claim 12, wherein the plurality of pixels belonging to the second subset is received by the device coupled to the sensor from a remote device.

19. The device of claim 12, wherein the sensor is an ultrasonic fingerprint sensor.

20. The device of claim 12, wherein the identifier is a one-time sensor identifier.

21. A non-transitory computer-readable storage medium, wherein the non-transitory computer-readable storage medium comprises instructions executable by a processor, the instructions comprising instructions to:
receive sensed information for each pixel from a plurality of pixels of a sensor for an at least one sensing environment;
determine a first variance representing a variation in the sensed information for a first subset of the plurality of pixels using the sensed information for each pixel from the first subset of the plurality of pixels of the sensor;
determine a second variance representing a variation in the sensed information for a second subset of the plurality of pixels using the sensed information for each pixel from the second subset of the plurality of pixels of the sensor, wherein the first subset of the plurality of pixels is different from the second subset of the plurality of pixels;
determine a pixel identifier value for each pixel from a third subset of the plurality of pixels by comparing the sensed information for each pixel from the third subset of the plurality of pixels with the first variance and the second variance; and
generate the identifier using the pixel identifier values for each of the plurality of pixels from the third subset of the plurality of pixels.

22. The non-transitory computer-readable storage medium of claim 21, wherein the plurality of pixels from the third subset also belong to the first subset and the second subset.

23. The non-transitory computer-readable storage medium of claim 21, wherein the plurality of pixels from the second subset also belong to the first subset.

24. The non-transitory computer-readable storage medium of claim 21, further comprising determining the pixel identifier value for each pixel from the third subset of the plurality of pixels by receiving the sensed information for a plurality of sensing environments.

25. The non-transitory computer-readable storage medium of claim 21, wherein the plurality of pixels belonging to the second subset is received by the device coupled to the sensor from a remote device.

26. An apparatus for generating an identifier for a sensor, comprising:
means for accessing, by a computing device, sensed information for each pixel from a plurality of pixels of the sensor for an at least one sensing environment;
means for determining, by the computing device, a first variance representing a variation in the sensed information for a first subset of the plurality of pixels using the sensed information for each pixel from the first subset of the plurality of pixels of the sensor;

means for determining, by the computing device, a second variance representing a variation in the sensed information for a second subset of the plurality of pixels using the sensed information for each pixel from the second subset of the plurality of pixels of the sensor, wherein the first subset of the plurality of pixels is different from the second subset of the plurality of pixels;

means for determining, by the computing device, a pixel identifier value for each pixel from a third subset of the plurality of pixels by comparing the sensed information for each pixel from the third subset of the plurality of pixels with the first variance and the second variance; and means for generating, by the computing device, the identifier using the pixel identifier values for each of the plurality of pixels from the third subset of the plurality of pixels.

27. The apparatus of claim 26, further comprising means for determining the pixel identifier value for each pixel from the third subset of the plurality of pixels by receiving the sensed information for a plurality of sensing environments.

28. The apparatus of claim 26, wherein generating the identifier value comprises means for concatenating the pixel identifier values for the plurality of pixels from the third subset of the plurality of pixels.

29. The apparatus of claim 26, wherein the plurality of pixels belonging to the second subset is received by the computing device coupled to the sensor from a remote device.

30. The apparatus of claim 26, wherein the identifier is a one-time sensor identifier.

* * * * *